June 19, 1945. H. J. DE N. McCOLLUM 2,378,781
HEATING APPARATUS
Filed Oct. 6, 1942 2 Sheets-Sheet 1
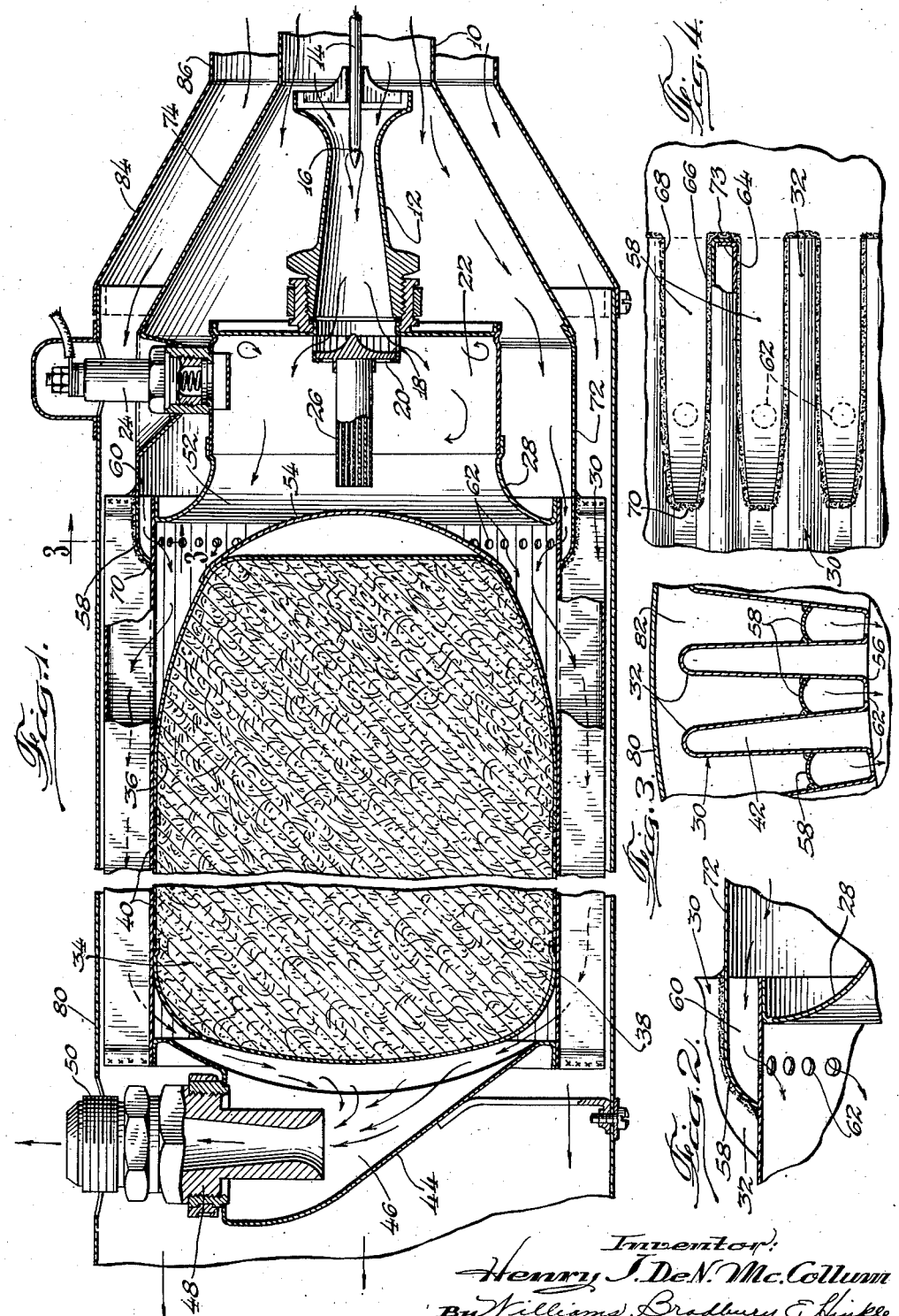

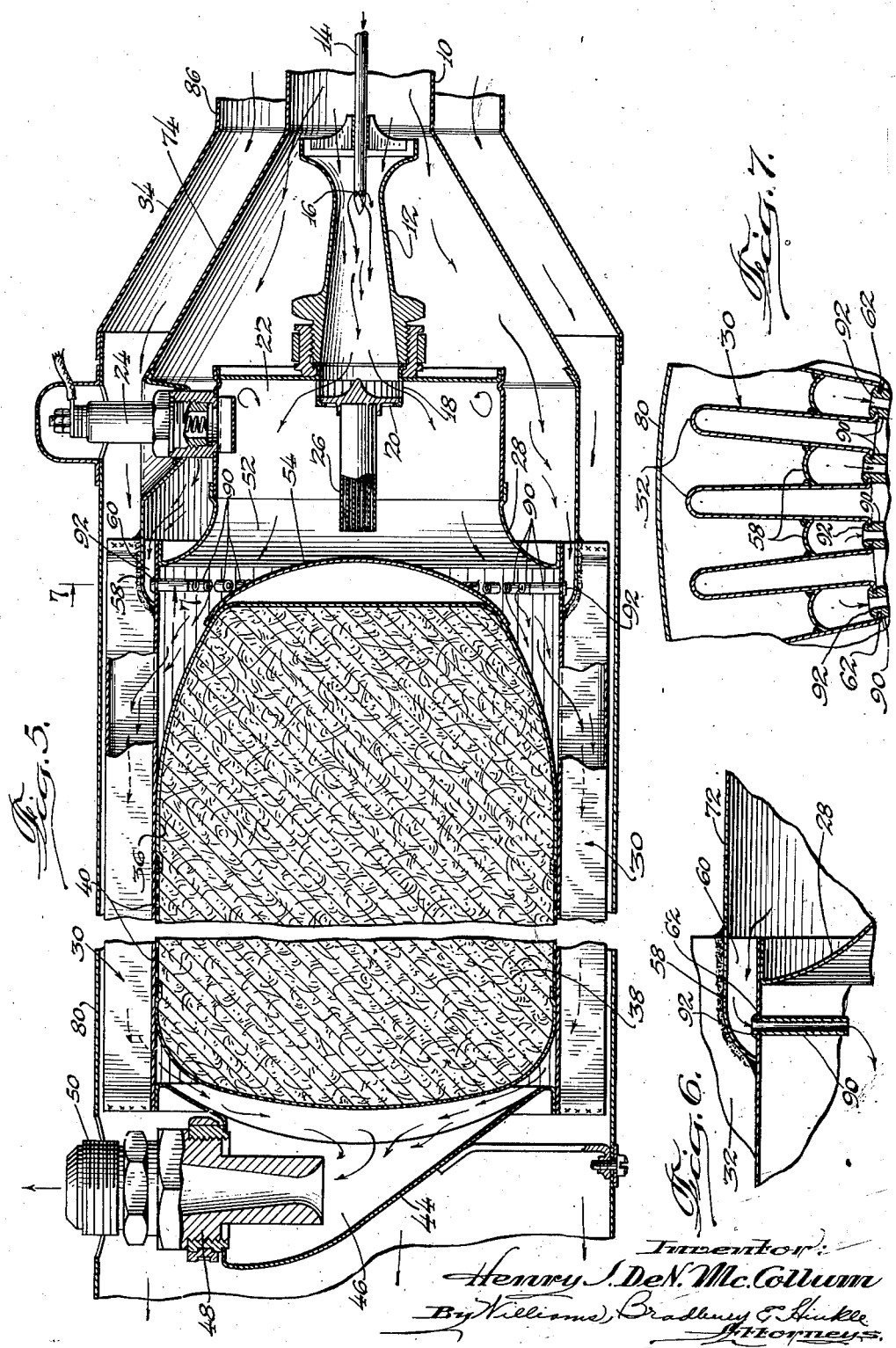

Patented June 19, 1945

2,378,781

UNITED STATES PATENT OFFICE 2,378,781

HEATING APPARATUS

Henry J. De N. McCollum, Chicago, Ill.; Thelma McCollum executrix of said Henry J. De N. McCollum, deceased Application October 6, 1942, Serial No. 460,968

9 Claims. (Cl. 126—116)

My invention relates to heating apparatus and more especially to heaters of the internal combustion type particularly adapted for, but not limited to, use in aircraft.

In heaters of the internal combustion type, it is common to provide finned heat transfer means for transferring heat from the products of combustion to the ventilating air directed over the heat transfer means by a ram or blower for circulating air. The heated products of combustion are originally directed against the fins at one end of the heat transfer means and where the hot products of combustion first come in contact with the fins, these fins are raised to a temperature which is much in excess of the temperature of other portions of the fins and particularly that portion adjacent the outlet end of the heater. There is a practical limit to the temperature to which the fins can be heated and this limits the total quantity of heat which can be given off by a heater of any given size and shape.

An object of my invention is to provide heating apparatus of the internal combustion type in which local hot spots are eliminated from the hollow fins and the heat transfer means is heated to a substantially uniform temperature throughout its length. Since this uniform temperature may be the practical temperature limit, an ancillary object of my invention is to increase the heating efficiency of the apparatus.

Another object of my invention is to provide heating apparatus wherein the temperature range between different parts of the heat transfer means is reduced to a minimum and stresses and strains caused by great variations in temperature of different portions of the heat transfer means are avoided.

Another object of my invention is to provide new and improved heating apparatus which is extremely compact, light in weight, and has a high heating output.

Other objects and advantages will become apparent as the description proceeds.

In the drawings:

Fig. 1 is a view showing a longitudinal section through a heater embodying my invention;

Fig. 2 is an enlarged view taken on the same plane as Fig. 1, but showing more clearly the manner in which the secondary air is admitted to the heater;

Fig. 3 is a view showing a partial, transverse section and is taken on the line 3—3 of Fig. 1;

Fig. 4 is a plan view of a section of the inlet end of the heat transfer means;

Fig. 5 is a view similar to Fig. 1, but showing a modified form of my invention;

Fig. 6 is an enlarged view taken in the same plane as Fig. 5 and illustrating more clearly the arrangements for admitting secondary air; and Fig. 7 is a view on an enlarged scale showing a partial, transverse section and is taken on the line 7—7 of Fig. 5.

In Figs. 1 to 4, inclusive, I have illustrated my invention as being embodied in heating apparatus comprising a heater having an air inlet 10 which is supplied with air from a ram, blower or other suitable means. Part of the air flowing through the inlet 10 enters a Venturi tube 12 supplied with either fuel alone or a rich mixture of fuel and air by a fuel supply pipe 14 having openings 16 at the throat of the Venturi tube 12. The combustible mixture formed in the Venturi tube 12 flows through ports 18 in a burner tube 20 and enters the combustion chamber 22 where the combustible mixture is ignited by an electrical igniter 24. This igniter may be provided with the usual thermostatic switch for cutting off the current to the igniter when the heater reaches operating temperature, and thereafter ignition is maintained by a reigniter 26.

A flaring plate 28 serves to connect the discharge end of the combustion chamber 22 with the inlet end of a tubular heat transfer means or heat exchanger 30 having hollow fins 32 extending lengthwise thereof. A muffler 34 is located in the heat exchanger 30 and has a sheet metal shell 36 containing a quantity of glass wool 38 or stainless steel wool, or other suitable material. The shell 36 has openings 40 communicating with the passages 42 in the interior of the hollow fins 32 and these openings 40 constitute acoustic couplings between the passages 42 and the interior of the muffler 34.

The outlet end of the heat exchanger 30 is closed by a plate 44 which cooperates with the adjacent end of the muffler 34 to form an outlet chamber 46. An outlet fitting 48 serves to connect the outlet chamber 46 with any suitable exhaust pipe attached to the threaded end 50 of the fitting 48.

The products of combustion from the combustion chamber 22 flow through a passage 52 into the passages 42 in the hollow fins 32. The passage 52 lengthens out as it approaches the heat exchanger 30, due to the tapered shape of the end of the muffler adjacent the combustion chamber. This extension of the passage 52 as it approaches the heat exchanger 30, permits the hot gases from the combustion chamber initially to contact the heat exchanger 30 over an appreciable portion of its length and by thus spreading out the gases of combustion and distributing them lengthwise of the heat exchanger, the formation of local hot spots in the hollow fins is avoided. The extreme end of the muffler 34 is protected from the burning gases in the combustion chamber by a hollow cap 54 formed of nichrome or other heat resisting material.

In order to insure the elimination of all hot spots from that portion of the heat exchanger with which the hot gases first come in contact, I have provided means for admitting secondary air which cools the inlet end of the heat exchanger and mixes with the products of combustion flowing from the combustion chamber and serves to reduce somewhat the temperature of these gases. Since the bases 56 of the hollow fins 32 are most apt to develop hot spots, my novel arrangement for introducing secondary air is particularly designed to cool the bases of the hollow fins adjacent the inlet end of the heat exchanger 30. This means assumes the form of curved sheet metal fingers 58 which cooperate with the side walls and bases of these fins to form ducts 60 which direct secondary air into the passage 52 through an annular series of openings 62 formed in the bases 56 of the hollow fins.

The ends of the hollow fins 32 are directed inwardly and arranged in overlapping relationship, as indicated at 64 in the cut away portion of Fig. 4. The fingers 58 are seam welded along their edges to the sides of the hollow fins, as indicated at 66 and 68 and the curved lower end of each finger 58 is seam welded to the base of a fin, as indicated at 70. The fingers 58 are shown as integral extensions of an air supply tube 72 and this tube is seam welded to the closed ends of the hollow fins, as indicated at 73. The tube 72 is supplied with air from the inlet 10 by way of a connecting cone 74 so that part of the air flowing through the inlet 10 passes into cone 74 and tube 72 and thence through duct 60 and openings 62 into passage 52.

The secondary air flowing throught the ducts 60 cools the adjacent portions of the hollow fins 32 and particularly the bases 56 thereof at the portions where the hot gases of combustion contact these bases near the outlet of the combustion chamber. Since the portions of the fins which are cooled by this secondary air are those portions which are most likely to develop hot spots, my novel means for admitting secondary air serves to eliminate hot spots from the heat exchanger and, therefore, permits the entire heat exchanger to be operated at a higher and more efficient temperature.

The secondary air flowing into the passage 52 mixes with the products of combustion therein and this slightly cools these products of combustion. The products of combustion with the secondary air entrained therein then flow into the passages 42 in the hollow fins. After the products of combustion have traveled the length of the hollow fins, they enter the outlet chamber 46 and are discharged through outlet fitting 48 to atmosphere.

The heater is enclosed in a casing 80 which cooperates with the heat exchanger 30 to form ventilating air passages 82 between the hollow fins 32. The inlet end of the casing 80 is connected to a cone 84 communicating with a ventilating air inlet 86 supplied with ventilating air from a ram, blower, or other suitable means.

Preferably the ventilating air inlet 86 and the inlet 10 for the secondary air and air for the combustible mixture are connected to separate blowers or rams, although under some conditions it may be satisfactory to supply both of these inlets with air from a common ram or blower or other similar means. The outlet of the casing 80 may communicate directly with the aircraft cabin or other space to be heated, or with a duct system for distributing the heated ventilating air to several different points.

The embodiment shown in Figs. 5, 6 and 7 is identical with the embodiment of Figs. 1 to 4, inclusive, except that in the embodiment of Figs. 5, 6 and 7 the tubes 90 are inserted in the openings 62 and are secured therein by riveting over the upper ends of the tubes, as indicated at 92. in Fig. 1 in that the tubes 90 conduct the secondary air to the center of the passage 52 and midway between opposite sides of the passage, so that the secondary air mixes thoroughly with the products of combustion flowing from the combustion chamber 22 to the heat exchanger 30. For certain purposes this modification of my invention is more desirable than the form shown in Fig. 1 in that the tubes 90 conduct the secondary air to the center of the passage 52 and prevent this secondary air from forming a heat insulating blanket between the products of combustion and that portion of the heat exchanger 30 immediately to the left of the opening 62.

It is to be understood that my invention is not limited to the details shown and described, but may assume numerous other forms and that my invention is to be construed as including all variations and modifications falling within the scope of the appended claims.

I claim:

1. Heating apparatus of the class described, comprising a tubular hollow finned heat exchanger, a combusion chamber for supplying hot products of combustion to one end of said heat exchanger, means cooperating with the bases of the hollow fins to form ducts adjacent the inlet end of the heat exchanger, said heat exchanger having openings connecting said ducts with the interior of said heat exchanger, means for supplying secondary air to said ducts, and means for directing ventilating air over said heat exchanger.

2. Heating apparatus of the class described, comprising a tubular heat exchanger having hollow fins provided with sides and bases, curved fingers located between the sides of said hollow fins and cooperating with said sides and the bases of said fins to form air ducts, said bases being provided with openings establishing communication between said air ducts and the interior of said heat exchanger, a combustion chamber for supplying hot products of combustion to said heat exchanger, means for supplying secondary air to said ducts, a muffler located in said heat exchanger, and means for directing ventilating air over said heat exchanger.

3. Heating apparatus of the class described, comprising a tubular heat exchanger having hollow fins provided with sides and bases, curved fingers located between the sides of said hollow fins and cooperating with said sides and the bases of said fins to form air ducts, said bases being provided with openings establishing communication between said air ducts and the interior of said heat exchanger, a combustion chamber for supplying hot products of combustion to said heat exchanger, means for supplying secondary air to said ducts, and means for directing ventilating air over said heat exchanger.

4. Heating apparatus of the class described, comprising a tubular heat exchanger having hollow fins provided with sides and bases, curved fingers interposed between said hollow fins and one end of said heat exchanger and coooperating with the sides and bases of said hollow fins to provide secondary air ducts, a combustion chamber for supplying hot gases to said end of the heat exchanger, means for supplying a combustible mixture to said combustion chamber and for supplying secondary air to said ducts, other means for directing ventilating air over said heat exchanger, and a muffler located in said heat exchanger.

5. In heating apparatus of the class described, the combination of a tubular finned heat exchanger, a combustion chamber for supplying hot gases to one end of said heat exchanger, fingers cooperating with said fins to form secondary air passages adjacent the bases of said fins and at said end of the heat exchanger, said heat exchanger having openings connecting said ducts with the interior of said heat exchanger, means for supplying secondary air to said ducts, and means for directing ventilatitng air over said heat exchanger.

6. Heating apparatus of the class described, comprising a tubular heat exchanger having fins extending lengthwise thereof, a combusion chamber for supplying hot gases to one end of said heat exchanger, fingers located at said end and cooperating with said fins to form secondary air ducts, tubes communicating with said ducts and projecting radially inward therefrom, means for supplying secondary air to said ducts and tubes, and means for directing ventilating air over said heat exchanger.

7. Heating apparatus of the class described, comprising a tubular heat exchanger having hollow fins, means for supplying hot gas to said fins, fingers located between said fins at one end of said heat exchanger and cooperating therewith to form ducts for cooling air, tubes communicating with the outlets of said ducts and extending radially inward therefrom, and means for directing ventilating air over said heat exchanger.

8. Heating apparatus of the class described, comprising a tubular heat exchanger having hollow fins extending lengthwise thereof, a combustion chamber for supplying hot gases to one end of said heat exchanger, a muffler located in said heat exchanger and cooperating with said hollow fins to provide a passage for flow of hot gases from said combusion chamber to said heat exchanger, means for directing secondary air over the ends of said fins adjacent said combustion chamber and radially inward to approximately the center of said passage, and means for directing ventilating air over said heat exchanger.

9. Heating apparatus comprising a tubular heat exchanger having hollow fins extending lengthwise thereof, means for supplying hot fluid to the interior of said hollow fins adjacent one end of said heat exchanger, said heat exchanger including a plurality of cooling air tubes between said fins and radially arranged adjacent said end of said heat exchanger, said tubes directing cooling air into said hot fluid before said fluid engages said fins, and means for supplying cooler fluid to the exterior of said fins and to said air tubes.

HENRY J. DE N. McCOLLUM.